US 12,039,895 B2

(12) United States Patent
Tochtermann et al.

(10) Patent No.: US 12,039,895 B2
(45) Date of Patent: Jul. 16, 2024

(54) LABEL, LABEL TAPE AND METHOD FOR MANUFACTURING LABELS

(71) Applicant: S+P Samson GmbH, Kissing (DE)

(72) Inventors: Karl Tochtermann, Purgen (DE); Roland Arndt, Mering (DE)

(73) Assignee: S+P SAMSON GMBH, Kissing (DE)

( * ) Notice: Subject to any disclaimer, the term of this patent is extended or adjusted under 35 U.S.C. 154(b) by 0 days.

(21) Appl. No.: 17/875,088

(22) Filed: Jul. 27, 2022

(65) Prior Publication Data
US 2023/0054362 A1 Feb. 23, 2023

(30) Foreign Application Priority Data
Jul. 28, 2021 (EP) .................................. 21188118

(51) Int. Cl.
*B32B 43/00* (2006.01)
*B29C 65/00* (2006.01)
(Continued)

(52) U.S. Cl.
CPC ................ *G09F 3/02* (2013.01); *B29C 66/43* (2013.01); *B32B 37/00* (2013.01); *C09J 7/35* (2018.01);
(Continued)

(58) Field of Classification Search
CPC ............. B32B 43/006; Y10T 156/1195; Y10T 156/1994
See application file for complete search history.

(56) References Cited

U.S. PATENT DOCUMENTS

| 4,076,882 A | 2/1978 | Fenster et al. |
|---|---|---|
| 4,249,226 A | 2/1981 | Westberg et al. |
| (Continued) | | |

FOREIGN PATENT DOCUMENTS

| AU | 684449 B3 | 12/1997 |
|---|---|---|
| DE | B229601 C2 | 12/1984 |
| (Continued) | | |

OTHER PUBLICATIONS

Extended European Search Report for International Application 211881180.0-1016, dated Jan. 18, 2022.

*Primary Examiner* — Philip C Tucker
*Assistant Examiner* — Nickolas R Harm
(74) *Attorney, Agent, or Firm* — Seager, Tufte & Wickhem, LLP

(57) ABSTRACT

A label including a base material with at least one adhesive region and a cover material, a label tape and a method for manufacturing labels are disclosed. The method includes providing a base material web and applying at least one adhesive to the base material web along at least one row by means of at least one applicator. The adhesive is applied to the base material web intermittently along the row so that the row comprises a plurality of individual adhesive regions spaced apart from one another by adhesive-free regions. The method also includes applying a cover material to at least some regions of the base material web so that a plurality of the applied adhesive regions are completely covered by the cover material, and at least partially separating the base material web and/or the cover material exclusively along adhesive-free regions by means of at least one separating device.

11 Claims, 4 Drawing Sheets

(51) Int. Cl.
  *B32B 37/00* (2006.01)
  *C09J 7/35* (2018.01)
  *G09F 3/02* (2006.01)
(52) U.S. Cl.
  CPC ....... *B32B 43/006* (2013.01); *C09J 2203/334* (2013.01); *C09J 2301/204* (2020.08); *G09F 2003/0226* (2013.01); *G09F 2003/023* (2013.01); *Y10T 156/1195* (2015.01); *Y10T 156/1994* (2015.01)

(56) References Cited

U.S. PATENT DOCUMENTS

| | | | |
|---|---|---|---|
| 4,251,313 | A | 2/1981 | Abe |
| 4,264,156 | A | 4/1981 | Spycher |
| 4,638,843 | A | 1/1987 | Sinko |
| 4,671,003 | A | 6/1987 | Vitol |
| 4,844,765 | A | 7/1989 | Reith |
| 5,290,616 | A | 3/1994 | Cowan et al. |
| 5,334,276 | A | 8/1994 | Meier |
| 5,351,426 | A | 10/1994 | Voy et al. |
| 5,868,891 | A | 2/1999 | Weir et al. |
| 6,231,712 | B1 | 5/2001 | Torres |
| 6,383,593 | B1 | 5/2002 | Fabel |
| 6,403,189 | B1 | 6/2002 | Donahue |
| 6,413,345 | B1 * | 7/2002 | Treleaven ............ G09F 3/0289 40/310 |
| 6,641,048 | B1 | 11/2003 | Schintz et al. |
| 6,686,014 | B1 | 2/2004 | Washburn et al. |
| 6,830,795 | B1 | 12/2004 | Downs |
| 6,905,747 | B2 | 6/2005 | Auchter et al. |
| 6,991,838 | B2 | 1/2006 | Schwertfeger et al. |
| 7,252,880 | B2 | 8/2007 | Posa et al. |
| 7,938,924 | B2 | 5/2011 | Lisec |
| 7,943,222 | B2 | 5/2011 | Rivest |
| 7,947,366 | B2 | 5/2011 | Ishiwatari et al. |
| 7,964,228 | B2 | 6/2011 | Milliorn |
| 8,110,057 | B2 | 2/2012 | Rice et al. |
| 8,632,875 | B2 | 1/2014 | Oldorff |
| 8,841,505 | B2 | 9/2014 | Floeter et al. |
| 8,980,405 | B2 | 3/2015 | Daniell et al. |
| 9,058,753 | B2 | 6/2015 | Van Boom et al. |
| 9,102,186 | B2 | 8/2015 | Raming |
| 9,302,279 | B2 | 4/2016 | Kluge |
| 9,488,610 | B2 | 11/2016 | Heppe |
| 9,676,537 | B2 | 6/2017 | Fenech, III et al. |
| 10,532,538 | B2 | 1/2020 | Zeng |
| 10,603,886 | B2 | 3/2020 | Ilinich et al. |
| 2003/0091817 | A1 * | 5/2003 | Amano .................... C09J 7/401 428/354 |
| 2004/0175545 | A1 | 9/2004 | Krebs et al. |
| 2006/0207144 | A1 | 9/2006 | Milliorn |
| 2007/0048481 | A1 | 3/2007 | Melvin |
| 2008/0187715 | A1 | 8/2008 | Wang et al. |
| 2009/0076472 | A1 | 3/2009 | Goldwasser et al. |
| 2010/0038430 | A1 * | 2/2010 | Sasazaki ........... H01L 21/67092 235/487 |
| 2010/0288764 | A1 | 11/2010 | Frost et al. |
| 2012/0238932 | A1 | 9/2012 | Atteia et al. |
| 2014/0295121 | A1 | 10/2014 | Ogden et al. |
| 2015/0266259 | A1 | 9/2015 | Flynn |
| 2016/0279924 | A1 * | 9/2016 | Igari ..................... B65C 9/0015 |
| 2020/0055291 | A1 | 2/2020 | Ottow et al. |

FOREIGN PATENT DOCUMENTS

| | | |
|---|---|---|
| DE | 3631021 A1 | 3/1988 |
| DE | 9101464 U1 | 5/1991 |
| DE | 29614833 U1 | 11/1996 |
| DE | 19642040 C1 | 1/1998 |
| DE | 19653891 C1 | 6/1998 |
| DE | 19738540 C2 | 7/1999 |
| DE | 19948894 C1 | 7/2000 |
| DE | 10016097 C1 | 6/2001 |
| DE | 202004018325 U1 | 3/2005 |
| DE | 102004046164 A1 | 4/2006 |
| DE | 202009009375 U1 | 10/2010 |
| DE | 102012112000 A1 | 10/2013 |
| DE | 102012106386 A1 | 1/2014 |
| DE | 202015004875 U1 | 9/2015 |
| EP | 0101376 A2 | 2/1984 |
| EP | 0328925 B1 | 6/1993 |
| EP | 0461337 B1 | 3/1994 |
| EP | 0610005 A1 | 8/1994 |
| EP | 0866750 B1 | 4/2001 |
| EP | 0890162 B1 | 7/2001 |
| EP | 1036386 B1 | 8/2002 |
| EP | 1092644 B1 | 4/2003 |
| EP | 1144202 B1 | 7/2003 |
| EP | 1224650 B1 | 9/2005 |
| EP | 1339540 B1 | 12/2005 |
| EP | 1593478 B1 | 9/2006 |
| EP | 1724739 B1 | 10/2008 |
| EP | 102007037620 A1 | 2/2009 |
| EP | 1053289 B2 | 6/2009 |
| EP | 2158888 A1 | 3/2010 |
| EP | 2300874 B1 | 3/2012 |
| EP | 2469991 A2 | 6/2012 |
| EP | 2653300 A2 | 10/2013 |
| EP | 2259921 B1 | 8/2014 |
| EP | 2653304 B1 | 8/2018 |
| EP | 3186156 B1 | 8/2018 |
| EP | 3154495 B1 | 11/2018 |
| EP | 3489011 A1 | 5/2019 |
| GB | 2288162 A | 10/1995 |
| WO | 9011140 A1 | 10/1990 |
| WO | 9739434 A1 | 10/1997 |
| WO | 9928889 A1 | 6/1999 |
| WO | 0032412 A1 | 6/2000 |
| WO | 0022602 A9 | 9/2000 |
| WO | 0145073 A2 | 6/2001 |
| WO | 0159745 A1 | 8/2001 |
| WO | 0189352 A1 | 11/2001 |
| WO | 0222350 A1 | 3/2002 |
| WO | 2006032570 A2 | 3/2006 |
| WO | 2007035246 A1 | 3/2007 |
| WO | 2007122456 A1 | 11/2007 |
| WO | 2009032397 A1 | 3/2009 |
| WO | 2009118455 A1 | 10/2009 |
| WO | 2009153593 A1 | 12/2009 |
| WO | 2014072856 A1 | 5/2014 |
| WO | 2015060770 A1 | 4/2015 |
| WO | 2015190968 A1 | 12/2015 |
| WO | 2016030071 A1 | 3/2016 |
| WO | 2019086634 A1 | 5/2019 |
| WO | 2019194888 A9 | 6/2020 |
| WO | 2020174389 A1 | 9/2020 |

\* cited by examiner

LABEL, LABEL TAPE AND METHOD FOR MANUFACTURING LABELS

CROSS REFERENCE TO RELATED APPLICATIONS

This application claims priority to EP Application No. 21 188 118.0, filed Jul. 28, 2021, the contents of which are herein incorporated by reference in their entirety.

BACKGROUND

Labels are used for a plurality of applications. For instance, labels are used for marking items to facilitate identification, classification and/or sorting of the marked items.

In order to facilitate the attachment of labels to different items, labels are often provided with an adhesive. Thus, such self-adhesive labels may be adhered to items, eliminating the need for additional connecting elements.

However, the use of adhesives with such self-adhesive labels entails a number of drawbacks with respect to the manufacture and/or usage of the labels.

For instance, the adhesive used may contaminate and/or damage machines and/or tools which are used in the manufacture and/or processing of the self-adhesive labels. This can occur, e.g., when parts of the label are cut or die-cut after the adhesive has already been applied to the label. The adhesive may contaminate and/or damage the cutting or die cutting tool used during the cutting or die cutting process. Other tools and/or machines for processing and/or handling the labels, in particular after the cutting or die cutting process, may also be contaminated and/or damaged by the adhesive.

In addition, the adhesive may also cause disadvantages in the application of the labels in the respective field of application, for example, in the marking of objects. For instance, the adhesive may extend beyond an edge of the label and/or the adhesive may gather on an edge of the label, which may contaminate and/or otherwise impair the user's hands and/or the object to which the label has been attached and/or any other objects.

To date, no or only insufficient measures have been known from the prior art to counteract such disadvantages of self-adhesive labels provided with an adhesive. For instance, document DE 195 01 380 A1 discloses a label and a method for manufacturing said label with reduced bleeding of pressure sensitive adhesives. In this process, a composite of a carrier tape and a first film web with a self-adhesive finish is die-cut into smaller sub-film sections on a first die cutter. Via a second die cutter, another film web is also die-cut into smaller top film sections that are larger than the bottom film sections. The top film sections are placed over the bottom film sections. As a result, the top film sections are larger on all sides than the bottom film sections.

In the process described, however, the composite of the backing tape and the self-adhesive first film web is die-cut, which means that during die-cutting, and possibly also during further processing of the labels, the tools and/or machines used may be contaminated and/or damaged by contact with the adhesive.

SUMMARY

It is an object of the present invention to provide a self-adhesive label and/or a method for manufacturing self-adhesive labels in order to overcome the disadvantages of the prior art and, in particular, to facilitate the handling of self-adhesive labels.

This object is achieved by the subject-matter of the independent claims.

Advantageous embodiments with purposive further embodiments of the invention are indicated in the respective dependent claims and in the following description.

A first aspect of the invention relates to a method for manufacturing labels. The method comprises step a), in which a base material web is provided.

The base material web may be provided in the form of a tape that is preferably wound on at least one roll and that is unwound from the roll when the base material web is provided. In the unwound state, the base material web may comprise a length of at least 10 m, preferably of at least 20 m, more preferably of at least 50 m, more preferably of at least 100 m in a longitudinal direction of the base material web. The base material web may further be a continuous web.

The base material web is preferably flexible and/or pliable in order to facilitate its processing and/or transport, e.g., in the form of a wound roll.

The base material web may be a silicone-containing or a siliconized paper. The base material web may be a multilayer composite. For instance, such a multilayer composite may comprise at least one silicone layer. Alternatively, the base material web may be a plastic film, preferably a film made of polyester and/or at least one polyolefin. A film made of polypropylene (PP), polyethylene (PE) and/or polyvinyl chloride (PVC) is also conceivable. The base material web may comprise synthetic and/or natural materials.

Preferably, the base material web has a thickness of 50 µm to 200 µm, preferably of 50 µm to 70 µm, more preferably of 75 µm to 150 µm, more preferably of 100 µm to 150 µm.

The material of the base material web may have a relatively high stiffness or at least a higher stiffness than one or more of the other components of the manufactured label in order to improve the handling and/or robustness of the label, e.g., by means of providing a sufficiently high residual stress and/or restoring force of the base material web. This may additionally or alternatively improve the peeling behavior of the label, e.g., the peeling behavior of the base material web from another component of the label, and/or the peeling behavior of another component of the label from the base material web.

The base material web may be transported and provided by means of transportation means. The transportation means may comprise at least one drive unit driving the transportation means and thus the base material web. For this purpose, the transportation means may comprise a drive roll configured to interact with the base material web and drive it in a moving manner. The drive roll may be driven by the drive unit of the transportation means.

In addition, the base material web may be guided and/or provided to the manufacturing process via one or more redirecting rollers and/or guide rollers.

The method further comprises step b) in which at least one adhesive is applied to the base material web along at least one row by means of at least one applicator. The adhesive is applied to the base material web intermittently along the row so that the row comprises multiple or a plurality of individual adhesive areas, each spaced apart by adhesive-free areas.

The adhesive may be applied to the base material web, e.g., via a hot melt application head as an applicator. Alternatively, the applicator may be a printing device, e.g., a screen-printing device, which prints the adhesive onto the base material web. It is also conceivable to use a plurality of applicators, e.g., a plurality of hot melt application heads and/or printing devices, which apply adhesive to the base material web either at least partially simultaneously or at least partially successively.

The applicator may comprise at least one opening from which the adhesive may be dispensed and applied to the base material web. Preferably, the applicator comprises a plurality of openings which may be arranged in a matrix-like manner, e.g., in one row or in a plurality of rows.

A number of different types of adhesive can be used to apply to the base material web. Moreover, the adhesive may be applied to the base material web in different layer thicknesses. The types of adhesives and/or the layer thickness of the respective adhesive that is to be applied can be selected and/or adjusted according to the requirements regarding the adhesive force of the adhesive and/or the properties of the item to which the label is to be attached, and/or according to the strain at the connection between the label and the item to which the label is to be attached. For instance, in applications for items with poor adhesive properties, such as steel or rolled products made of steel, concrete, wood or some plastics, an adhesive with a stronger adhesive force can be selected and/or applied to the base material web with a greater layer thickness. The adhesive may be, e.g., one or more of the following groups: hot melt adhesives, acrylic dispersion adhesives, and acrylic solvent-based adhesives. The adhesive may be applied to the base material web with a layer thickness of 15 to 250 µm, preferably of 40 to 200 µm. The applicator may be configured to vary the layer thickness of the adhesive.

The adhesive may be stored in at least one adhesive reservoir. If required, i.e., during application and/or before the adhesive is applied to the base material web, the adhesive may be supplied from the adhesive reservoir of the applicator.

The applicator may apply the adhesive to the base material web in rows, i.e., along at least one row. The adhesive may be applied to the base material web at preferably predefined time intervals, i.e., discontinuously or intermittently along the row. This allows a plurality of individual adhesive areas, each spaced apart by adhesive-free areas, to be applied to the base material web in rows. The applicator and the base material web may move relative to one another during application of the adhesive to the base material web. For this purpose, the applicator may be transported, e.g., by means of at least one, preferably controlled, movement device, and/or the base material web may be transported, e.g., by means of at least one, preferably controlled, base material web transportation means.

The adhesive areas may each have a substantially uniform shape and/or substantially uniform dimensions. The adhesive areas can have any shape and/or contour. The shape and/or contour of the adhesive areas may depend, among other things, on the way the adhesive is applied and/or on the type of applicator. Preferably, the adhesive areas each have a substantially rectangular shape with respect to a viewing direction that is perpendicular to the surface of the base material web to which the adhesive areas are attached. However, other shapes and/or contours are also conceivable.

The present invention is described in connection with an adhesive. However, the invention is implementable with any type of coating material. In other words, any type of coating material can be applied to the base material web as an alternative or in addition to the adhesive.

The method further comprises step c), according to which a cover material is provided. The cover material can be provided in the form of a tape which is preferably wound on a roll and is unwound from the roll when the cover material is provided. In the unwound state, the cover material formed as a tape may have a length in a longitudinal direction of the cover material tape of at least 10 m, preferably at least 20 m, more preferably at least 50 m, more preferably at least 100 m. Furthermore, the cover material may be in the form of a web, preferably a continuous web.

The cover material is preferably flexible and/or pliable in order to facilitate its processing and/or transportation as, e.g., in the form of a wound roll.

The cover material can be a silicone-containing or a siliconized paper. The cover material can be a multilayer composite. For example, such a multilayer composite may comprise at least one silicone layer. Alternatively, the cover material may be a plastic film, preferably a film made of polyester and/or at least one polyolefin. A film made of polypropylene (PP), polyethylene (PE) and/or polyvinyl chloride (PVC) is also conceivable. The cover material may comprise synthetic and/or natural materials.

Preferably, the cover material has a thickness of 50 µm to 200 µm, more preferably 75 µm to 150 µm, more preferably 100 µm to 150 µm.

The cover material may also have a relatively high stiffness, or at least a higher stiffness than one or more of the other components of the label, to improve the handling and/or robustness of the label, e.g., by providing a sufficiently high residual stress and/or restoring force of the cover material. This may also improve the peeling behavior of the label, e.g., the peeling behavior of the cover material from another component of the label, e.g., from the base material web, or the peeling behavior of another component of the label from the cover material.

The cover material may be transported and provided by transportation means. The transportation means may comprise at least one drive unit which may drive the transportation means and thus move the cover material. For this purpose, the transportation means may comprise a drive roll configured to interact with the cover material and drive it in a moving manner. The drive roll may be driven by the drive unit of the transportation means.

Moreover, the cover material may be guided and provided by one or a plurality of redirecting rollers and/or guide rollers.

The method further comprises step d) according to which the cover material is at least partially applied to the base material web so that a plurality of the applied adhesive areas is completely covered by the cover material.

The cover material and the base material web with the adhesive regions adhering thereto are preferably laminated together by means of at least one laminating device to form a composite comprising at least the base material web, the adhesive and the cover material.

When applying the cover material at least in areas to the base material web, the cover material may be moved along a transport direction of the cover material, and the base material web may be moved along a transport direction of the base material web, wherein the transport direction of the cover material and the transport direction of the base material web may run parallel and/or coincident with one another. Alternatively, the cover material may remain stationary and the base material web may be moved, e.g., by means of at least one transport direction of the base material web, or the base material web may remain stationary and the cover material may be moved, e.g., by means of at least one transport direction of the cover material.

With respect to a vertical direction, the cover material may be applied to the base material web from above, from below, or from one side when the label manufacturing plant is in an operating position.

Due to the fact that the cover material completely covers several or a plurality, i.e., at least two, of the applied adhesive areas, the cover material also extends over at least one adhesive-free area which is arranged between the adhesive areas covered by the cover material. The cover material may cover more than two adhesive areas, e.g., 3, 4, 5, 10, 15, 20, or more adhesive areas. Furthermore, the cover material may at least partially cover adhesive-free areas not arranged along the row, i.e., not between two adjacent adhesive areas. For instance, the cover material may cover adhesive-free areas which are arranged at the side of the row, e.g., between two rows in case a plurality of rows is provided.

Preferably, the method also comprises step e) according to which the base material web and/or the cover material is at least partially separated exclusively along adhesive-free areas by at least one separating device.

Preferably, the base material web and/or the cover material is at least partially separated from each adhesive area exclusively along adhesive-free areas at a distance of at least 0.25 mm, preferably at least 0.5 mm, more preferably at least 1 mm, more preferably at least 1.5 mm, more preferably at least 2 mm, more preferably at least 3 mm, more preferably at least 4 mm, more preferably at least 6 mm, more preferably at least 8 mm, more preferably at least 10 mm.

Preferably, the base material web and/or the cover material is at least partially separated from an area of the adhesive areas exclusively along adhesive-free areas at a distance of 0.25 mm to 5 mm, preferably of 0.5 mm to 4 mm, more preferably of 0.5 mm to 3 mm, more preferably of 0.5 mm to 2 mm.

A separation in the sense of the present invention may imply a complete separation, i.e., a complete separation of respective areas of the base material web and/or of respective areas of the cover material, or only an area-wise and/or point-wise separation, e.g., perforation.

Preferably, the base material web and the cover material are at least partially separated simultaneously or successively.

However, only the base material web or only the cover material may be separated at least partially. For instance, the separating device may plunge into only one area of the composite comprising at least the base material web and the cover material, and thus at least partially separate only the base material web or only the cover material without at least partially separating both the base material web and the cover material.

The separating device may be, e.g., a die-cutting device configured for die-cutting the base material web and/or the cover material in order to separate respective areas of the base material web and/or respective areas of the cover material from each other at least partially, preferably completely.

The base material web and/or the cover material may be at least partially separated substantially transversely, particularly substantially transversely to the row or rows of adhesive areas, along adhesive-free areas. Alternatively, or additionally, the base material web and/or the cover material may be at least partially separated longitudinally, i.e., substantially parallel to the row or rows of adhesive areas, along adhesive-free areas.

By at least partially separating the base material web and/or the cover material exclusively along adhesive-free areas, the cutting contour of each individual label that has been manufactured lies entirely in areas where no adhesive has been applied. Consequently, contact of the adhesive with the separating device can be avoided or at least reduced in order to prevent or at least reduce contamination and/or damage to the separating device, e.g., the cutting or die-cutting tool.

Due to the adhesive-free separating edges of the base material web and/or the cover material manufactured in this way, contamination and/or damage to other tools and/or machines for processing and/or handling the labels may be avoided or at least reduced, particularly after the separation step.

A separation exclusively along adhesive-free areas may also prevent or at least reduce unwanted flow and/or distribution and/or smearing of the adhesive, for example beyond an edge of the cover material and/or the base material web.

Reduced contamination and/or damage to the respective tools and/or machines may also result in reduced downtimes and/or costs for maintenance and/or repairs arising for cleaning and/or repairing the tools and/or machines.

Multilayer composite materials are often used for labels. For example, the base material web can be a multilayer composite, the composite preferably having at least one silicone layer. When separating such composite materials by means of a separating device, e.g., a die-cutting device, individual layers, e.g., the silicone layer, may be impaired or damaged, thus allowing for the adhesive to enter the multilayer composite. This can impair the multilayer composite. For instance, this may result in individual layers of the composite becoming detached, which in turn may cause damage to corresponding processing tools and/or processing machines as well as downtimes of the same. These effects can be avoided or at least reduced by separations exclusively along adhesive-free areas.

Due to the adhesive-free separating edges of the manufactured label that can be achieved by means of the manufacturing process described above and the reduced flow and/or smearing of the adhesive, improved manageability of the labels may be achieved when using the labels. For example, contamination and/or other impairment of objects and/or on the body of the user, particularly on the hands of the user, caused by the adhesive may be avoided or at least reduced in this way. Thus, the ease of use of the labels manufactured may be increased.

Furthermore, this may enable automatic and reliable dispensability of the labels. In particular, contamination and/or damage to a label dispenser that can dispense the manufactured labels for use may be prevented or at least reduced. Moreover, downtimes and/or maintenance and/or repair costs of the label dispenser may be reduced.

Overall, the handling of the self-adhesive labels manufactured by means of the method according to the invention may be improved or facilitated both in the manufacturing process and during application, i.e., when applying the labels to objects.

Furthermore, the described manufacturing method, in particular the intermittent application of the adhesive to the base material web and the at least partial separation of the base material web and/or the cover material exclusively along adhesive-free areas, allows for a relatively high manufacturing speed of self-adhesive labels to be implemented, with comparatively few and/or less complex manufacturing steps compared to the processes known from the prior art.

The separation of the base material web and/or the cover material by means of at least one separating device may be controlled at least partially automatically, e.g., with the aid of a controller. For this purpose, at least one sensor, preferably an optical sensor, may additionally be provided. At least one marking may be provided on the cover material and/or on the base material web. The sensor may be configured to detect the marking, preferably optically, and to provide information about the position of the marking to the controller. The controller may control an alignment and/or a positioning of the separating device(s) relative to the cover material and/or to the base material web, at least partly based on the information provided. In this regard, the controller may control an alignment device and/or a positioning device to align and/or position the separating device(s) relative to the cover material and/or the base material web.

It may also be provided that the sensor and the controller may control an alignment and/or a positioning of the separating device(s) relative to the cover material and/or the base material web without such markings. Instead of a marking, the sensor may detect alternative features and provide information thereon to the controller to control an alignment and/or a positioning of the separating device(s) relative to the cover material and/or the base material web. For instance, the sensor may be adapted to detect the alignment and/or positioning of the adhesive regions and provide information thereon to the controller. The controller may be configured to control an alignment and/or a positioning of the separating device(s) relative to the cover material and/or the base material web, based at least partly on the information provided.

Preferably, the base material web is transported by means of at least one transportation means at least in sections along a transport direction of the base material web, and/or the cover material is transported by means of at least one transportation means at least in sections along a transport direction of the cover material.

The base material web and the cover material may be transported by means of common transportation means or several common transportation means. Alternatively, the base material web and the cover material may be transported by means of separate transportation means, preferably independently of each other. The transportation means may each have a drive roll that cooperates with and drives the base material web and the cover material, respectively. The transportation means may also have a plurality of rolls, at least one or more of which are driven.

In step b), preferably the row along which the adhesive is intermittently applied to the base material web extends along the transport direction of the base material web.

Preferably, the transport direction of the base material web and the transport direction of the cover material extend at least in sections at an angle of 30° to 120°, preferably of 40° to 110°, more preferably of 50° to 100°, more preferably of 60° to 95°, more preferably of 70° to 95°, to each other.

Prior to step d), the base material web is preferably redirected by means of at least one redirecting device from a first transport direction of the base material web to a second transport direction of the base material web so that the second transport direction of the base material web and the transport direction of the cover material run essentially parallel to each other or are coincident after redirection. Additionally, or alternatively, preferably prior to step d), the cover material is redirected by means of at least one redirecting device from a first transport direction of the cover material to a second transport direction of the cover material so that the second transport direction of the cover material and the transport direction of the base material web run essentially parallel to one another or are coincident after redirection.

The provision of at least one redirecting device, preferably of a plurality of redirecting devices, may allow for a variable spatial arrangement and/or orientation of the machine(s) and/or processing stations and/or tools used for the manufacturing process. In other words, the machines and/or processing stations and/or tools used for manufacturing the labels may thus be arranged spatially regardless of the provided or assumed orientation and/or positioning of the base material web and/or the cover material at the respective processing stations since the redirecting device may cause the target or required orientation and/or positioning of the base material web and/or the cover material by redirecting the same. In this way, the machines and/or processing stations and/or tools used to manufacture the labels may be arranged, e.g., in a more compact and/or space-efficient manner in the room.

Preferably, at least prior to the application of the cover material in step d), the transport direction of the cover material is substantially opposite to the transport direction of the base material web, at least in some areas. This allows for the base material web and the cover material to be fed from substantially opposite directions, which may allow for flexible and/or independent guiding of the base material web and the cover material.

Alternatively, or additionally, at least during the application of the cover material in step d), the transport direction of the cover material and the transport direction of the base material web may substantially be in alignment.

The cover material may be applied to the base material web longitudinally along the row or rows of adhesive areas. In this case, the cover material may have a smaller width transverse to the transport direction of the cover material and/or the transport direction of the base material web than the base material web, in particular if several rows of adhesive areas are applied to the base material web next to each other. In this case, several cover material webs, in particular one cover material web per row of adhesive areas, may be applied to the base material web next to each other, preferably substantially parallel to each other. Alternatively, the cover material may be applied to the base material web transversely to the row or rows of adhesive areas and/or to the transport direction of the cover material and/or the transport direction of the base material web.

In step d), several cover material webs are preferably applied to the base material web so that several of the applied adhesive areas are completely covered by a respective cover material web. Preferably, the cover material webs are applied to the base material web running essentially parallel to each other.

In step b), the adhesive is preferably applied to the base material web intermittently along at least two, preferably at least three, more preferably at least four, substantially parallel rows which are spaced apart from each other by adhesive-free areas. Each row preferably comprises a plurality of individual adhesive areas, each spaced apart from one another by adhesive-free areas. The rows may be applied to the base material web next to each other with respect to a direction transverse to the rows and/or to the transport direction of the cover material and/or the transport direction of the base material web. The rows are preferably spaced apart from each other by adhesive-free areas.

In step b), the rows may be applied to the base material web substantially simultaneously, i.e., an adhesive area may be applied to the base material web substantially simultaneously for each intended row. Alternatively, the rows may be applied to the base material web one after the other, i.e., the adhesive areas for one row are applied intermittently to the base material web and subsequently, i.e., delayed, the adhesive areas for a further row are applied intermittently to the base material web.

Preferably, step e) comprises the following step(s):
e1) running parallel to the row, the base material web and/or the cover material are separated at least partially, preferably completely outside the adhesive areas; and/or
e2) running transversely to the row of adhesive areas, the base material web and/or the cover material are separated at least partially, preferably completely outside the adhesive areas.

By the respective separation courses of the manufactured label, i.e., running parallel to the row and/or transversely to the row of adhesive areas, the contour and/or the dimensions and/or further properties, e.g., the number of adhesive areas per label, may be determined or at least affected. In addition, individual labels may thus be separated from a label tape with a plurality of contiguous labels which may be arranged in the label tape, e.g., in a matrix-like manner, preferably in a plurality of rows.

Steps e1) and e2) may be carried out simultaneously or successively.

The base material web may be a release material, preferably a silicone paper, for pulling off the respective adhesive area or the respective areas of the manufactured label, and the cover material may be a plastic film, preferably a film of polyester and/or at least one polyolefin. Alternatively, the base material web may be a plastic film, preferably a film of polyester and/or at least one polyolefin, and the cover material may be a release material, preferably a silicone paper, for pulling off the respective adhesive area or the respective areas of the manufactured label.

When the manufactured label is utilized, the release material may be pulled off the respective adhesive area, leaving the adhesive area attached to the plastic film. The plastic film with the adhesive adhered thereto in the adhesive area may then be adhered to an object, e.g., to mark the object.

The plastic film, which may be configured as a base material web or a cover material, has a thickness of preferably 50 µm to 200 µm, more preferably of 75 µm to 150 µm, more preferably of 100 µm to 150 µm. The material of the base material web may also have a relatively high stiffness or at least a higher stiffness than one or more of the further components of the label in order to improve the handling and/or robustness of the manufactured label, for example by a sufficiently high residual stress and/or restoring force of the base material web. The peeling behavior of the label, e.g., the peeling behavior of the base material web from a further component of the label or the peeling behavior of a further component of the label from the base material web may thus be improved.

The adhesive may have a greater adhesive force on the base material web than on the cover material. Alternatively, the adhesive may have a greater adhesive force on the cover material than on the base material web. The adhesive force may be determined, at least in part, by the surface structure of the cover material and/or the base material web. Thus, the surface structure of the cover material and/or the base material web may be predefined and/or modified, e.g., by a treatment process, to bring about a desired and/or required adhesion force on the facing material and/or the base material web. Alternatively, or additionally, the adhesive force of the adhesive may be determined at least in part by its composition.

Prior to step d), the cover material may preferably be divided into smaller cover material segments, preferably cover material strips, in such a way, preferably transversely to the row of adhesive areas and/or transversely to the transport direction of the cover material and/or transversely to the transport direction of the base material web, that the cover material segments have a width in a width direction which is greater by 1 mm to 15 mm, preferably by 2 mm to 10 mm, than a width of the respective adhesive areas in the same width direction after the cover material has been applied to the base material web. Alternatively, or additionally, preferably before step d), the base material web may be divided into smaller base material web segments, preferably base material web strips, such that the base material web segments have a width in a width direction which is greater by 1 mm to 15 mm, preferably by 2 mm to 10 mm, than a width of the respective adhesive areas in the same width direction.

Providing such cover material segments and/or base material web segments may increase flexibility and/or variability when manufacturing the labels.

Preferably, the width direction may extend along the row of adhesive areas and/or along the transport direction of the base material web and/or along the transport direction of the cover material.

Preferably, the cover material segments may each have a longitudinal axis, wherein, in step d), the cover material segments are preferably applied to the base material web and the adhesive areas such that the longitudinal axes of the cover material segments are transverse to the row of adhesive areas and/or transverse to the transport direction of the base material web and/or transverse to the transport direction of the cover material after the respective cover material segments have been applied to the respective adhesive areas. Alternatively, or additionally, the base material web segments may preferably each have a longitudinal axis which preferably runs along the row of adhesive areas and/or along the transport direction of the base material web and/or along the transport direction of the cover material.

Preferably, at least one marking element, preferably a plurality of marking elements, may be applied to the base material web and/or to the cover material at least prior to step e), wherein the separation of the base material web and/or of the cover material in step e) may be controlled at least in part on the basis of the marking element or elements.

The separation of the cover material and/or the base material web via the adhesive areas in step e) may be controlled at least partly automatically at least partly with the aid of the marking element or elements, e.g., by means of a control unit provided. At least one sensor, preferably an optical sensor, may additionally be provided for this purpose. The sensor may be set up to detect the marking element or elements, preferably optically, and to provide information to the control unit about the position and/or orientation of the marking element or elements. The controller may control an orientation and/or a positioning of the release device(s) relative to the cover material and/or the base material web, based at least in part on the information provided. The controller may thereby control an alignment device and/or a positioning device to align and/or position the separation device(s) relative to the cover material and/or the base material web and to subsequently separate the cover material and/or the base material web at least partially.

The sensor and the control unit may alternatively control an alignment and/or a positioning of the separating device(s) relative to the cover material and/or the base material web without marking elements. Instead of a marking element, the sensor may detect alternative features and provide information thereon to the control unit in order to control an alignment and/or a positioning of the separating device(s) relative to the cover material and/or the base material web. For instance, the sensor may be adapted to detect the alignment and/or positioning of the applied adhesive regions and provide information thereon to the controller. The controller may be arranged to control an alignment and/or a positioning of the release device(s) relative to the cover material and/or the base material web, based at least in part on the information provided.

Preferably, the labels manufactured by means of the process may be suitable to be adhesively applied to steel, concrete, plastics and/or wood.

Preferably, the adhesive applied to the base material web in step b) comprises at least one of the following groups: hot melt adhesives, acrylic dispersion adhesives, and acrylic solvent-based adhesives.

In step a), the base material web is preferably unwound from a wound base material web roll and fed to the applicator. Alternatively, or additionally, preferably in step c), the cover material is unwound from a wound cover material roll.

In step b), the adhesive regions are preferably applied to the base material web along the row at a distance of 5 mm to 30 mm, more preferably from 5 mm to 20 mm, from each other.

In step b), the adhesive regions are preferably applied to the base material web intermittently along the row at a time interval of 20 ms to 1000 ms, preferably of 20 ms to 800 ms, more preferably of 20 ms to 700 ms, more preferably of 30 ms to 600 ms, more preferably of 40 ms to 500 ms, more preferably of 50 ms to 400 ms, more preferably of 60 ms to 350 ms, more preferably of 60 ms to 300 ms, more preferably of 60 ms to 250 ms.

A second aspect of the invention, which also achieves the above object, relates to a label comprising a base material having at least one adhesive region to which an adhesive is applied, and an adhesive-free edge extending completely around the adhesive region to which no adhesive is applied.

The label further comprises a cover material that completely covers the adhesive region and covers at least a portion of the adhesive-free edge and is flush with at least a portion of the adhesive-free edge.

The advantages, features and embodiments explained with respect to the label manufacturing method described above are also applicable to the label.

Preferably, the adhesive-free edge has a width extending, preferably perpendicularly, from an edge of the base material to the adhesive region. Preferably, the width is from 0.5 mm to 15 mm, more preferably from 1 mm to 5 mm.

Preferably, the base material is a release material, preferably a silicone paper, for pulling off from the adhesive area of the label, and preferably the cover material is a plastic film, preferably a film of polyester and/or at least one polyolefin. Alternatively, the base material may be a plastic film, preferably a film of polyester and/or at least one polyolefin, and preferably the cover material may be a release material, preferably a silicone paper, for pulling off from the adhesive area of the label.

Preferably, the adhesive has a greater adhesive force on the base material than on the cover material. Alternatively, the adhesive may have a greater adhesive force on the cover material than on the base material.

Preferably, the label may be suitable to be adhesively applied to steel, concrete, plastics and/or wood.

Preferably, the adhesive may comprise at least one of the following groups: hot melt adhesives, acrylic dispersion adhesives, and acrylic solvent-based adhesives.

A third aspect of the invention, which also achieves the object mentioned at the beginning, relates to a label tape comprising a plurality of interconnected individual labels. The label tape has a base material web having several or a plurality of individual adhesive regions arranged along at least one row, to each of which an adhesive is applied. The adhesive regions are spaced apart by adhesive-free regions.

In addition, the label tape has a cover material that completely covers at least one adhesive area and adheres to the adhesive area. The cover material extends completely over at least the adhesive area and over at least a portion of at least one adhesive-free area.

Preferably, the cover material completely covers at least two adhesive regions and adheres to the adhesive regions. Preferably, the cover material extends completely over at least the two adhesive regions and over at least one adhesive-free region disposed between the two adhesive regions.

Several or a plurality of individual labels may be separated from the label tape in a separation step, e.g., in accordance with the method described above, so as to obtain individual, separate labels from the label tape.

Preferably, at least in a portion of the adhesive-free area, the cover material is curved in a direction away from the base material web.

Such curvatures may serve as an indicator or reference in the separation step described above, e.g., to position a separation line along the adhesive-free areas based on the position and/or orientation of the curvatures. This may allow for more precise and efficient separation.

Preferably, the cover material has individual cover material segments separated from each other. The cover material segments may each have a longitudinal axis and may be attached to the adhesive areas such that the longitudinal axes of the cover material segments are each transverse to the row or along the row of adhesive areas.

Preferably, the cover material segments have a width in a width direction that is greater by 1 mm to 15 mm, preferably by 2 mm to 10 mm, than a width of the respective adhesive regions in the same width direction.

Preferably, the adhesive regions are distanced to each other from 5 mm to 30 mm, preferably from 5 mm to 20 mm.

Preferably, the base material web has at least two, preferably at least three, preferably at least four rows of adhesive regions, along each of which a plurality of individual adhesive regions are applied to the base material web.

Preferably, the base material web is a release material, preferably a silicone paper, for pulling off from the respective adhesive area of the respective label, and the cover material is preferably a plastic film, preferably a film of polyester and/or at least one polyolefin. Alternatively, the base material web may be a plastic film, preferably a film of polyester and/or at least one polyolefin, and the cover material may be a release material, preferably a silicone paper, for pulling off from the respective adhesive area of the respective label.

Preferably, the adhesive has a greater adhesive force on the base material web than on the cover material. Alternatively, the adhesive may have a greater adhesive force on the cover material than on the base material web.

Preferably, the individual labels are suitable for being adhesively applied to steel, concrete, plastics and/or wood.

Preferably, the adhesive comprises at least one of the following groups: hot melt adhesives, acrylic dispersion adhesives, and acrylic solvent-based adhesives.

Preferably, the label tape is windable onto a base material web roll.

Preferably, the label tape has a length along the row of adhesive regions of at least 500 mm, preferably at least 750 mm, more preferably at least 1000 mm, more preferably at least 2000 mm, more preferably 3000 mm, and a width substantially transverse to the length of 100 mm to 500 mm, more preferably of 150 mm to 450 mm, more preferably of 200 mm to 400 mm, more preferably of 250 mm to 350 mm.

The following list of aspects presents alternative and/or additional features of the invention:

1. A method for manufacturing labels, preferably self-adhesive labels, the method comprising the following steps:
    a) providing a base material, preferably a base material web;
    b) applying at least one coating material to the base material web, preferably an adhesive, by means of at least one applicator, preferably along at least one row, wherein the coating material, preferably an adhesive, is applied to the base material web intermittently, preferably along the row, so that a plurality of individual coating material regions, preferably adhesive regions, are applied, preferably in the rows that are spaced apart from one another by coating-free regions, preferably adhesive-free regions;
    c) providing a cover material, preferably at least one cover material web;
    d) applying the cover material to at least some regions of the base material web so that a plurality of the applied coating material regions, preferably adhesive regions, are covered at least partially, preferably completely, by the cover material; and
    e) at least partially separating the base material web and/or the cover material exclusively along coating-free regions, preferably adhesive-free regions, by means of at least one separating device.
2. The method according to aspect 1, wherein:
    the base material web is transported by at least one transportation means at least in sections along a transport direction of the base material web;
    and/or
    the cover material is transported by at least one transportation means at least in sections along a transport direction of the cover material.
3. The method according to aspect 2, wherein in step b) the row along which the coating material, preferably the adhesive, is applied intermittently to the base material web extends along the transport direction of the base material web.
4. The method according to aspect 2 or 3, wherein the transport direction of the base material web and the transport direction of the cover material are at least in sections at an angle of 30° to 120°, preferably from 40° to 110°, more preferably of 50° to 100°, more preferably of 60° to 95°, more preferably of 70° to 95° to each other.
5. The method according to any one of aspects 2 to 4, wherein:
    prior to step d), the base material web is redirected from a first transport direction of the base material web to a second transport direction of the base material web by at least one redirecting device so that the second transport direction of the base material web and the transport direction of the cover material are substantially parallel to each other or coincide after redirection;
    and/or
    prior to step d), the cover material is redirected from a first transport direction of the cover material to a second transport direction of the cover material by at least one redirecting device so that the second transport direction of the cover material and the transport direction of the base material web are substantially parallel to each other or coincide after redirection.
6. The method according to any one of aspects 3 to 5, wherein, at least prior to applying the cover material in step d), the transport direction of the cover material extends substantially opposite to the transport direction of the base material web at least in certain areas;
    and/or
    at least when applying the cover material in step d), the transport direction of the cover material and the transport direction of the base material web substantially run in the same direction.
7. The method according to any one of the preceding aspects, wherein in step d), a plurality of cover material webs are applied to the base material web so that a plurality of the applied adhesive regions are completely covered by a respective cover material web, wherein the cover material webs are applied to the base material web preferably substantially parallel to one another.
8. The method according to any one of the preceding aspects, wherein in step b), the coating material, preferably the adhesive, is applied intermittently to the base material web along at least two, preferably at least three, more preferably at least four rows which are spaced apart from each other by coating-free regions, preferably adhesive-free regions running substantially parallel to each other, wherein each row comprises a plurality of individual coating material regions, preferably adhesive regions, which are spaced apart from each other by respective coating-free regions, preferably adhesive-free regions.
9. The method according to any one of the preceding aspects, wherein step e) comprises the following step(s):
    e1) running parallel to the row, the base material web and/or the cover material are separated at least partially, preferably completely outside the coating material regions, preferably adhesive regions;
    and/or
    e2) running transversely to the row of coating material regions, preferably adhesive regions, the base material web and/or the cover material are separated at least partially, preferably completely outside the coating material regions, preferably adhesive regions.
10. The method according to aspect 9, wherein steps e1) and e2) are carried out at least partially simultaneously or successively, preferably at a time interval from each other.
11. The method according to any one of the preceding aspects, wherein:
    the base material web is a release material, preferably a silicone paper, for pulling off from the respective coating material region, preferably adhesive region, or the respective coating material regions, preferably adhesive regions, of the manufactured label, and the cover material is a plastic film, preferably a film of polyester and/or at least one polyolefin;
    or the base material web is a plastic film, preferably a film of polyester and/or at least one polyolefin, and the cover material is a release material, preferably a silicone paper, for pulling off from the respective coating material region, preferably adhesive region, or the respective coating material regions, preferably adhesive regions, of the manufactured label.

12. The method according to any one of the preceding aspects, wherein:

the coating material, preferably the adhesive, comprises a greater adhesive force on the base material web than on the cover material;

or the coating material, preferably the adhesive, comprises a greater adhesive force on the cover material than on the base material web.

13. The method according to any one of the preceding aspects, wherein:

prior to step d), the cover material is divided into smaller cover material segments, preferably cover material strips, preferably transverse to the row of coating material regions, preferably adhesive regions, and/or transverse to the transport direction of the cover material and/or transverse to the transport direction of the base material web, such that the cover material segments comprise a width in a width direction that is greater by 1 mm to 15 mm, preferably by 2 mm to 10 mm than a width of the respective coating material regions, preferably adhesive regions, in the same width direction after the cover material has been applied to the base material web;

and/or prior to step d), the base material web is divided into smaller base material web segments, preferably base material strips, such that the base material segments comprise a width in a width direction that is greater by 1 mm to 15 mm, preferably by 2 mm to 10 mm than a width of the respective coating material regions, preferably adhesive regions, in the same width direction.

14. The method according to aspect 13, wherein the width direction extends along the row of coating material regions, preferably adhesive regions, and/or along the transport direction of the base material web and/or along the transport direction of the cover material.

15. The method according to aspect 13 or 14, wherein:

each of the cover material segments comprise a longitudinal axis, wherein, in step d), the cover material segments are applied to the base material web and the coating material regions, preferably the adhesive regions, such that the longitudinal axes of the cover material segments run transversely to the row of coating material regions, preferably adhesive regions, and/or transversely to the transport direction of the base material web after the respective cover material segments have been applied to the respective coating material regions, preferably adhesive regions;

and/or each of the base material segments comprises a longitudinal axis which extends along the row of coating material regions, preferably adhesive regions, and/or along the transport direction of the base material web and/or along the transport direction of the cover material.

16. The method according to any one of the preceding aspects, wherein, at least prior to step e), at least one marking element, preferably a plurality of marking elements, is/are applied to the base material web and/or to the cover material, wherein the separation of the base material web and/or the cover material is controlled at least partially on the basis of the marking element or the marking elements in step e), preferably by means of a controller provided.

17. The method according to any one of the preceding aspects, wherein the labels manufactured by means of the method are suitable for being adhesively applied to steel, concrete, plastics, and/or wood.

18. The method according to any one of the preceding claims, wherein the adhesive which is applied to the base material web in step b) comprises at least one of the following groups: hot melt adhesives, acrylic dispersion adhesives, and acrylic solvent-based adhesives.

19. The method according to any one of the preceding aspects, wherein:

in step a), the base material web is unwound from a wound base material web roll and fed to the applicator, and/or in step c), the cover material is unwound from a wound cover material roll.

20. The method according to any one of the preceding aspects, wherein, in step b), the coating material regions, preferably adhesive regions, are applied to the base material web along the row at a distance of 5 mm to 30 mm, preferably of 5 mm to 20 mm to each other.

21. The method according to any one of the preceding aspects, wherein, in step b), the coating material regions, preferably adhesive regions, are preferably applied to the base material web intermittently along the row at a time interval of 20 ms to 1000 ms, preferably of 20 ms to 800 ms, more preferably of 20 ms to 700 ms, more preferably of 30 ms to 600 ms, more preferably of 40 ms to 500 ms, more preferably of 50 ms to 400 ms, more preferably of 60 ms to 350 ms, more preferably of 60 ms to 300 ms, more preferably of 60 ms to 250 ms.

22. A label, comprising:

a base material with at least one coating material region, preferably an adhesive region, to which a coating material, preferably an adhesive, is applied, and a coating-free edge, preferably an adhesive-free edge, extending completely around the coating material region, preferably an adhesive region, to which no coating material, preferably adhesive, is applied; and a cover material which covers the coating material region, preferably the adhesive region, at least partially, preferably completely, and covers at least a region of the coating-free edge, preferably adhesive-free edge, and is preferably flush with at least a part of the coating-free edge, preferably adhesive-free edge.

23. The label according to aspect 22, wherein the adhesive-free edge comprises a width that extends, preferably perpendicular, from an edge of the base material to the adhesive region, wherein the width is from 0.5 to 15 mm, preferably from 1 mm to 5 mm.

24. The label according to aspect 22 or 23, wherein:

the base material is a release material, preferably a silicone paper, for pulling off from the adhesive region of the label, and wherein the cover material is a plastic film, preferably a film of polyester and/or at least one polyolefin;

or the base material is a plastic film, preferably a film of polyester and/or at least one polyolefin, and the cover material is a release material, preferably a silicone paper, for pulling off from the adhesive region of the label.

25. The label according to any one of aspects 22 to 24, wherein:
the adhesive comprises a greater adhesive force on the base material than on the cover material;
or
the adhesive comprises a greater adhesive force on the cover material than on the base material.

26. The label according to any one of aspects 22 to 25, wherein the label is suitable for being applied to steel, concrete, plastics, and/or wood.

27. The label according to any one of aspects 22 to 26, wherein the adhesive comprises at least one of the following groups: hot melt adhesives, acrylic dispersion adhesives, and acrylic solvent-based adhesives.

28. A label tape with a plurality of contiguous individual labels, comprising:
   a base material web with a plurality of individual coating material regions arranged along at least one row, preferably adhesive regions, each coating material region having a coating material, preferably an adhesive, applied thereon, wherein the coating material regions, preferably adhesive regions, are spaced apart from each other by coating-free regions, preferably adhesive-free regions; and
   a cover material which at least partially, preferably completely, covers at least one coating material region, preferably adhesive region, and adheres to the coating material region, preferably adhesive region, wherein the cover material extends at least over the coating material region, preferably adhesive region, and over at least one region of at least one coating-free region, preferably adhesive-free region.

29. The label tape according to aspect 28, wherein the cover material is curved in at least a section of the adhesive-free region in a direction facing away from the base material web.

30. The label tape according to aspect 28 or 29, wherein the cover material comprises individual cover material segments separated from each other, wherein each the over material segments comprises a longitudinal axis and is applied to the adhesive regions such that the longitudinal axes of the cover material segments run transversely to the row or along the row of adhesive regions, respectively.

31. The label tape according to any one of aspects 28 to 30, wherein the cover material segments comprise a width in a width direction which is greater by 1 mm to 15 mm, preferably by 2 mm to 10 mm, than a width of the respective adhesive regions in the same width direction.

32. The label tape according to any one of aspects 28 to 31, wherein the adhesive regions are distanced to each other from 5 mm to 30 mm, preferably from 5 mm to 20 mm.

33. The label tape according to any one of aspects 28 to 32, wherein the base material web comprises at least two, preferably at least three, preferably at least four rows of adhesive regions along each of which a plurality of individual adhesive regions are applied to the base material web.

34. The label tape according to any one of aspects 28 to 33, wherein:
the base material web comprises a release material, preferably a silicone paper, for pulling off from the respective adhesive region of the respective label, and wherein the cover material is a plastic film, preferably a film of polyester and/or at least one polyolefin;
or
the base material web is a plastic film, preferably a film of polyester and/or at least one polyolefin, and the cover material is a release material, preferably a silicone paper, for pulling off from the respective adhesive region of the respective label.

35. The label tape according to any one of aspects 28 to 34, wherein:
the adhesive comprises a greater adhesive force on the base material web than on the cover material;
or
the adhesive comprises a greater adhesive force on the cover material than on the base material web.

36. The label tape according to any one of aspects 28 to 35, wherein the individual labels are suitable for being applied to steel, concrete, plastics, and/or wood.

37. The label tape according to any one of aspects 28 to 36, wherein the label comprises at least one of the following groups: hot melt adhesives, acrylic dispersion adhesives, and acrylic solvent-based adhesives.

38. The label tape according to any one of aspects 28 to 37, wherein the label tape is windable into a base material roll.

39. The label tape according to any one of aspects 28 to 38, wherein the label tape has a length along the row of adhesive regions of at least 500 mm, preferably at least 750 mm, preferably at least 1000 mm, preferably at least 2000 mm, more preferably 3000 mm, and a width of 100 mm to 500 mm, preferably of 150 mm to 450 mm, more preferably of 200 mm to 400 mm, more preferably of 250 mm to 350 mm substantially transverse to the length.

BRIEF DESCRIPTION OF THE DRAWINGS

Further advantages, features and details of the invention will be apparent from the following description of a preferred embodiment as well as from the drawings. The features and feature combinations mentioned above in the description, as well as the features and feature combinations mentioned below in the description of the figures and/or shown alone in the figures can be used not only in the combination indicated in each case but also in other combinations or on their own without going beyond the scope of the invention.

DETAILED DESCRIPTION

Figure 1:
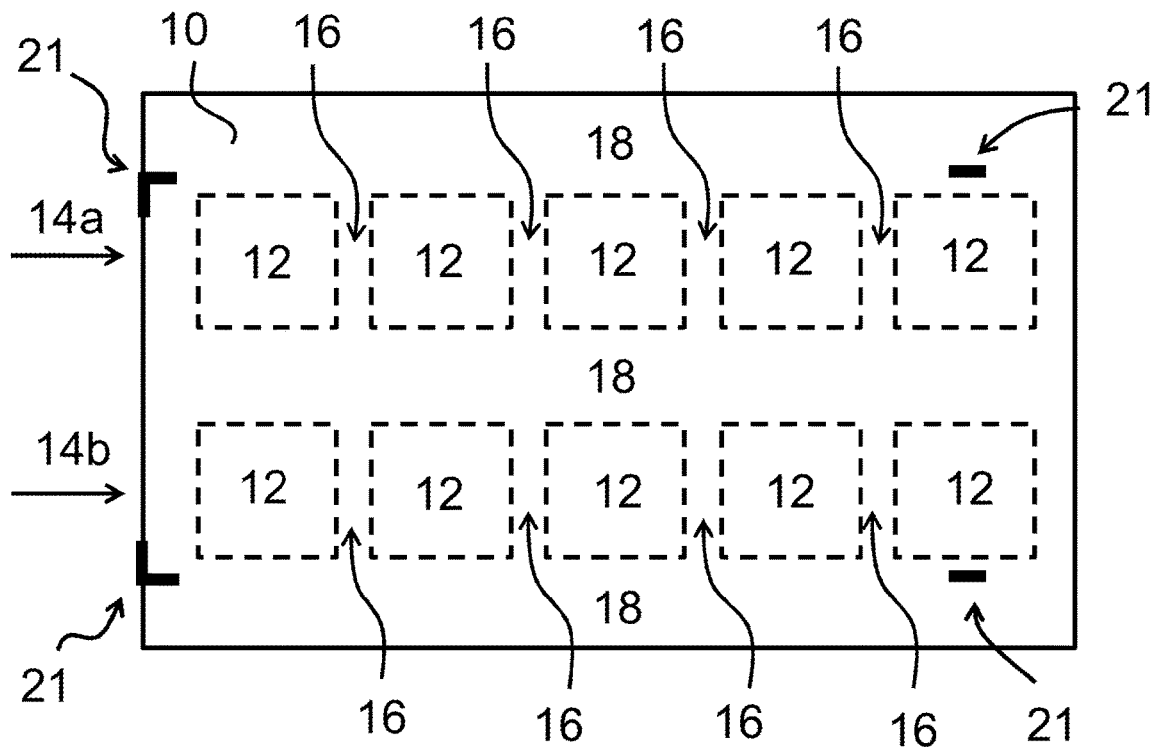
FIG. 1 shows a top view of a base material web with adhesive regions applied thereto in according to a first variant.
Figure 2:
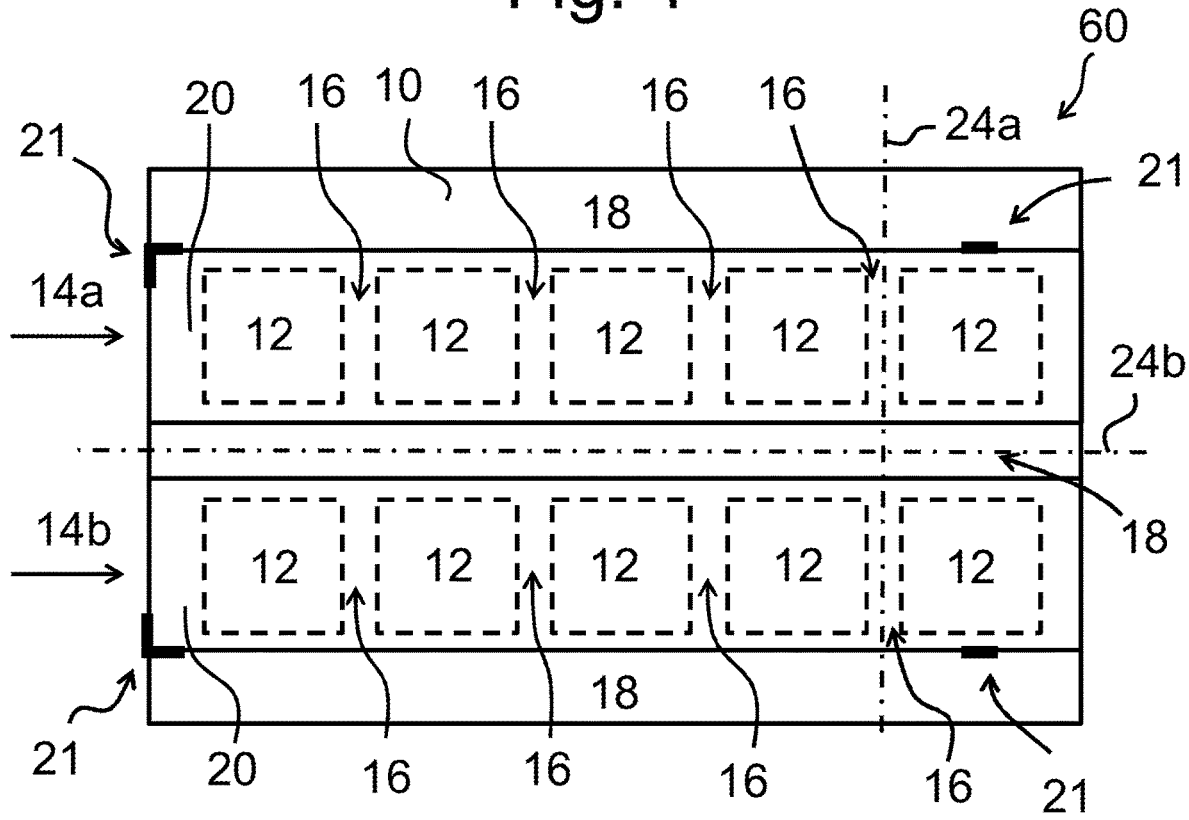
FIG. 2 shows a top view of a label tape according to an aspect of the invention with the base material web of FIG. 1 and an additional cover material applied to the base material web.

FIG. 1 and FIG. 2 show a base material web 10 with adhesive regions 12 applied thereto, each of said adhesive regions 12 comprising an adhesive adhering to the base material web 10. In these figures, the adhesive regions 12 are illustrated with dashed lines. Preferably, the base material web 10 is a continuous web. Preferably, the base material web 10 comprises a total length of at least 10 m, preferably of at least 20 m, more preferably of at least 50 m, more preferably of at least 100 m.

The base material web 10 may be a silicone-containing or a siliconized paper. The base material web 10 may be a multilayer composite. For instance, the base material web 10 may be a multilayer composite with at least one silicone layer. Alternatively, the base material web 10 may be a plastic film, preferably a film of polyester and/or at least one polyolefin. A film of polypropylene (PP), polyethylene (PE) and/or polyvinyl chloride (PVC) is also conceivable. The base material web 10 may comprise synthetic and/or natural materials.

In a manufacturing method according to the invention, the adhesive in the adhesive regions 12 is applied to the base material web 10 by means of an applicator (not illustrated) along two rows 14a, 14b whose path is marked with a respective arrow in FIGS. 1 and 2. According to the manufacturing method according to the invention, the adhesive is applied to the base material web 10 intermittently along the rows 14a, 14b so that each of the rows 14a, 14b comprises a plurality of individual adhesive regions 12, each of which being spaced apart from one another by adhesive-free regions 16. More than two rows of adhesive regions 12, e.g., at least three, four, or five rows at a time, may also be applied to the base material web 10.

In FIGS. 1 and 2, the adhesive regions 12 are rectangular in shape with respect to a viewing direction that is perpendicular to the surface of the base material web 10 to which the adhesive regions 12 are attached. However, the adhesive regions 12 may have alternative shapes and/or contours.

The rows 14a, 14b of adhesive regions 12 are arranged adjacent to and spaced apart from each other, i.e., the rows 14a, 14b of adhesive regions 12 are also spaced apart from each other transversely to the path of the rows 14a, 14b by adhesive-free regions 18. The rows 14a, 14b may be applied to the base material web 10 substantially simultaneously, i.e., an adhesive region 12 may be applied to the base material web 10 for each provided row 14a, 14b substantially simultaneously. Alternatively, the rows 14a, 14b may be applied to the base material web 10 successively, i.e., the adhesive regions 12 for a first row 14a are applied to the base material web 10 intermittently, and subsequently, i.e., at staggered intervals, the adhesive regions 12 are applied to the base material web 10 intermittently for another row 14b.

In FIG. 2, in addition to that shown in FIG. 1, a cover material 20 is arranged in areas on the base material web 10. The cover material 20 may, e.g., be unwound and provided from one or a plurality of rolls and applied to the base material web 10 by means of a device, e.g., a laminating device.

The cover material 20 completely covers a plurality of the applied adhesive areas 12 and the adhesive-free areas 16 disposed between the adhesive areas 12. According to the exemplary embodiment of FIG. 2, the cover material 20 is fed to the base material 10 in multiple parts and applied thereto. In particular, the cover material 20 is configured in the form of a strip or web, wherein a strip or web of the cover material 20 completely covers a respective row 14a, 14b of adhesive regions 12. In other words, a respective strip or web of the cover material 20 completely covers a respective row 14a, 14b of adhesive regions 12.

However, it is also conceivable to supply the cover material 20 in one piece to the base material web 10 and apply it thereto. In this case, the cover material 20 in one piece would completely cover both rows 14a, 14b of adhesive areas 12 or a plurality of rows of adhesive areas 12 in one piece.

The adhesive regions 12 are disposed between the base material web 10 and the cover material 20. Thus, from the perspective of FIG. 2, the adhesive regions 12 are hidden below the cover material 20.

The composite comprising at least the base material web 10, the adhesive regions 12 and the cover material 20 forms a label tape 60 which may be further processed into individual labels.

The label tape 60 may preferably be wound onto and unwound from a roll before and/or after the label tape 60 has been assembled or laminated. This may allow for the label tape 60 to be transported, e.g., to a recipient and/or to further processing stations.

In one step of the method according to the invention, the base material web 10 and the cover material 20, as a composite, are at least partially separated exclusively along adhesive-free areas 16, 18 by means of at least one separating device (not shown).

Exemplary separation lines 24a, 24b along which the base material web 10 and the cover material 20 are at least partially separated, are marked with dot-dash lines in FIG. 2.

The separating line 24a extends substantially transversely to the rows 14a, 14b of adhesive regions 12. Thus, the separating line 24a extends, on the one hand, through the adhesive-free regions 16 arranged between the adhesive regions 12 of a respective row 14a, 14b and, on the other hand, also through the adhesive-free region 18 arranged between the rows 14a, 14b. Thus, the separating line 24a corresponds to a cross-section of the label tape 60. In FIG. 2, for clarity, only one separating line 24a is shown between two adjacent adhesive regions 12 of respective rows 14a, 14b. However, it is understood that along the entire respective row 14a, 14b, the base material web 10 and the cover material 20 may each be separated in the adhesive-free areas 16, i.e., along respective separating lines 24a. Additional separation lines 24a preferably run substantially parallel to the separating line 24a illustrated in FIG. 2.

The separation line 24b extends substantially parallel to the rows 14a, 14b through the adhesive-free region 18 disposed between the rows 14a, 14b. Thus, the separation line 24b corresponds to a longitudinal section of the label tape 60. Although only one separation line 24b is shown in FIG. 2, further separation lines 24b may also be provided along which the base material web 10 and the cover material 20 may each be at least partially separated in the adhesive-free regions 18. Additional separation lines 24b preferably run essentially parallel to the separation line 24b shown in FIG. 2.

The cross section of the label tape 60, i.e., along the separating line 24a, may be made by means of a transverse separating device (not shown), and the longitudinal section of the label tape 60, i.e., along the separating line 24b, may be made by means of a longitudinal separating device.

Alternatively, the cross section and the longitudinal section may be made by means of a common separating device.

However, alternative separating lines deviating from the separating lines 24a, 24b shown in FIG. 2 are also conceivable, provided that the separating lines run exclusively along adhesive-free areas, e.g., adhesive-free areas 16, 18.

The base material web 10 has a plurality of marking elements 21 for controlling the separation of the base material web 10 and the cover material 20 partly based on the marking elements 21, preferably at least partly automatically. For this purpose, a controller (not shown) may be provided, which is configured to control an alignment and/or a positioning of at least one separating device relative to the cover material 20 and the base material web 10. Additionally, at least one sensor, preferably an optical sensor, may be provided, which is configured to detect the marking elements 21, preferably optically, and to provide information about the position of the marking elements 21 to the controller. The controller may be adapted to control an alignment and/or a positioning of the separating device relative to the cover material 20 and to the base material web 10, at least partly based on the information provided. In doing so, the controller may control an alignment device and/or a positioning device to align and/or position the separating device relative to the cover material 20 and the base material web 10.

The sensor and the controller may control an alignment and/or a positioning of the separating device relative to the cover material 20 and the base material web 10 even without the marking elements 21. Instead of the marking elements 21, the sensor may detect alternative features and provide information thereon to the controller to control an alignment and/or a positioning of the separating device relative to the cover material 20 and the base material web 10. For example, the sensor may be adapted to detect the alignment and/or positioning of the adhesive regions 12 and provide information thereon to the controller. The controller may be adapted to control an orientation and/or a positioning of the separating device relative to the cover material 20 and the base material web 10, based at least partly on the information provided.

Figure 3:
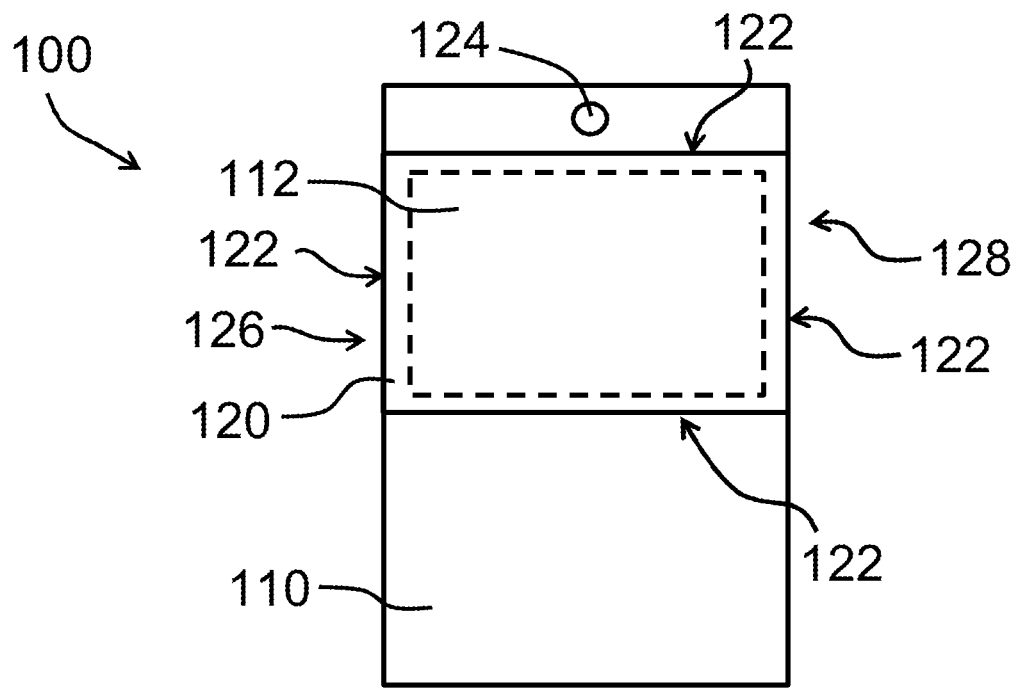
FIG. 3 shows a top view of an embodiment of a label according to the invention manufactured by means of a method according to the invention.
Figure 4:
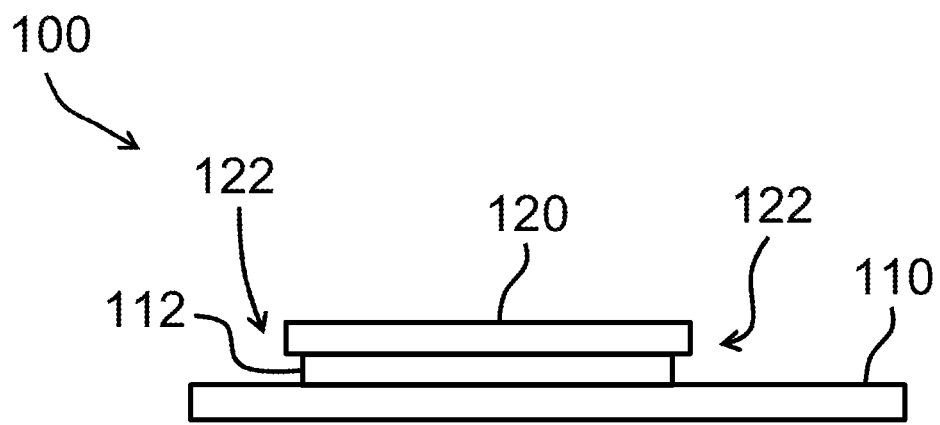
FIG. 4 shows a lateral view of the label of FIG. 3.

FIGS. 3 and 4 show an exemplary embodiment of a label 100 according to the invention, which label has been separated from the label tape 60 shown in FIG. 2 by means of at least one separating device in a separating step of the method according to the invention.

The label 100 comprises a base material 110 with at least one adhesive region 112 to which an adhesive is applied. The base material 110 has been separated from the base material web 10 shown in FIGS. 1 and 2. Although the label 100 shown in FIGS. 3 and 4 has only one adhesive region 112, the label 100 may alternatively have a plurality of adhesive regions 112.

The label 100 also includes an adhesive-free edge 122 with no adhesive being applied and extending completely around the adhesive region 112. The adhesive-free edge 122 includes a portion of the adhesive-free regions 16 shown in FIGS. 1 and 2 that are disposed between and spaced apart from adjacent adhesive regions 12 of a respective row 14a, 14b. The adhesive-free edge 122 also includes a portion of the adhesive-free regions 18 shown in FIGS. 1 and 2 that are disposed between and spaced apart from rows 14a, 14b of adhesive regions 12.

Furthermore, the label 100 comprises a cover material 120 that completely covers the adhesive region 112 and covers at least a portion of the adhesive-free edge 122. The cover material 120 has been separated from the cover material 20 shown in FIG. 2.

The adhesive region 112 is disposed between the base material 110 and the cover material 120. Thus, from the perspective shown in FIG. 3, the adhesive region 112 is hidden below the cover material 120.

The base material 110 also includes an opening 124 that may, in addition to the adhesive, serve as, e.g., a fastener for attaching the label 100 to objects.

In the regions 126, 128, the cover material 120 is flush with the adhesive-free edge 122 of the base material 110 (see FIG. 3). In FIG. 4, the regions 126, 128 are directed out of the drawing plane and into the drawing plane, respectively, so that the flush closure of the cover material 120 with the adhesive-free edge 122 of the base material 110 is not visible in FIG. 4.

Figure 5:
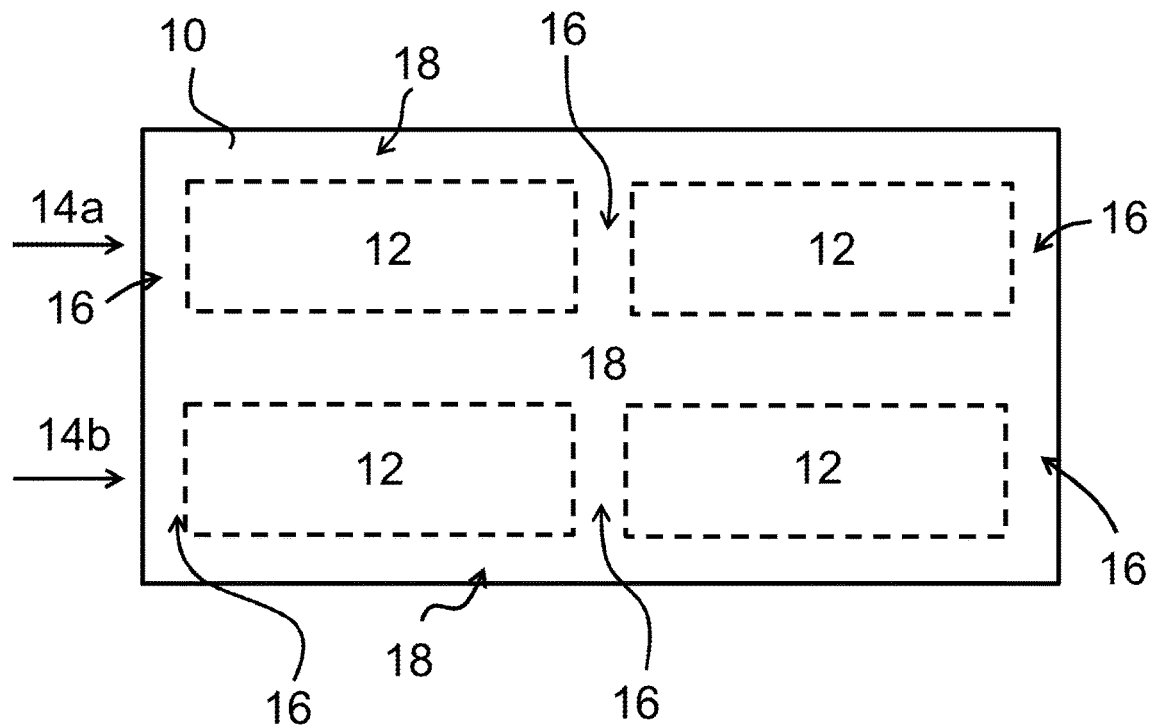
FIG. 5 shows a top view of a base material web with adhesive regions applied thereto in another variant.
Figure 6:
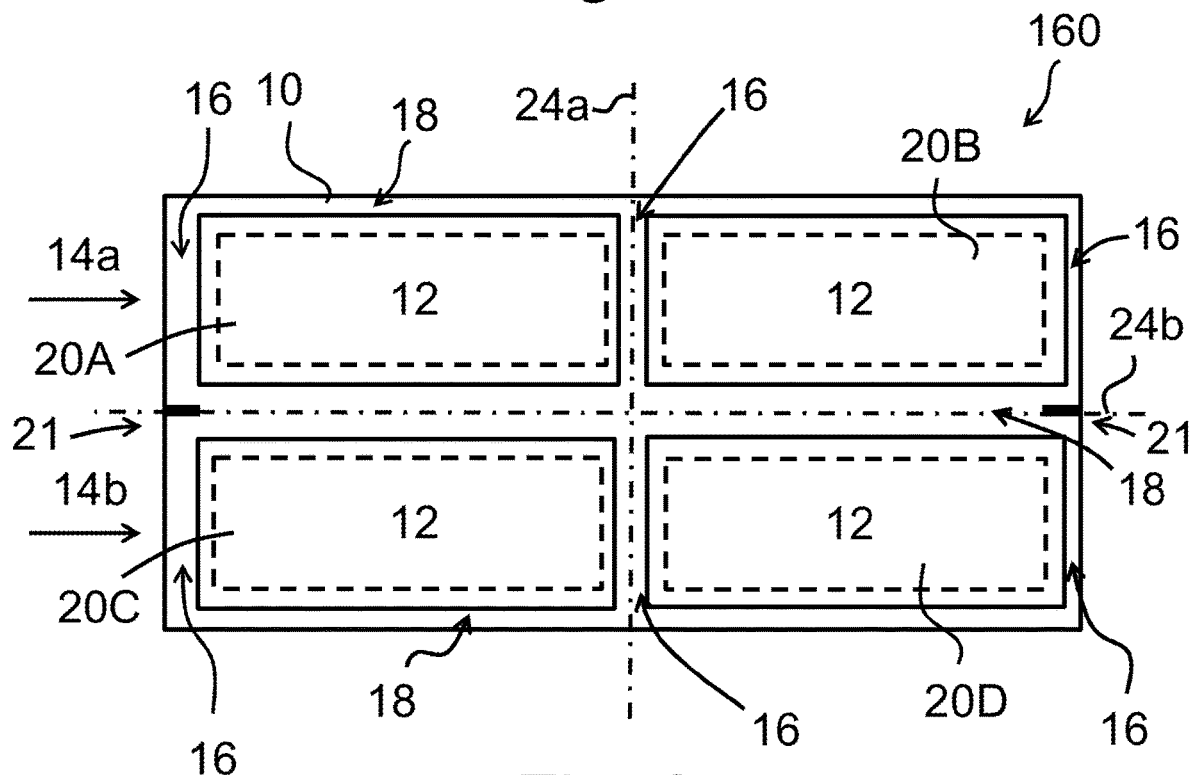
FIG. 6 shows a top view of a label tape according to an aspect of the invention with the base material web from FIG. 5 and additional cover material strips applied to the base material web.

FIGS. 5 and 6 show another alternative for manufacturing a label tape 160 having substantially the same or at least similar features as the label tape 60 of FIG. 2. The same or at least similar features are therefore indicated in FIGS. 5 and 6 with the same reference signs as in FIGS. 1 and 2.

Unlike the label tape 60, the label tape 160 shown in FIG. 6 comprises a plurality of cover material strips 20A, 20B, 20C, 20D along the rows 14a, 14b of adhesive regions 12. Each cover material strip 20A, 20B, 20C, 20D is disposed on a respective adhesive region 12. The cover material 20 may be provided, e.g., as a web that is separated into the individual cover material strips 20A, 20B, 20C, 20D before the cover material 20 is brought together, preferably laminated, with the base material web 10, which cover material strips 20A, 20B, 20C, 20D may subsequently be brought together, preferably laminated, with the base material web 10. As a result, no cover material 20 is arranged in a region of the adhesive-free areas 16, as can be seen in FIG. 6.

Figure 7:
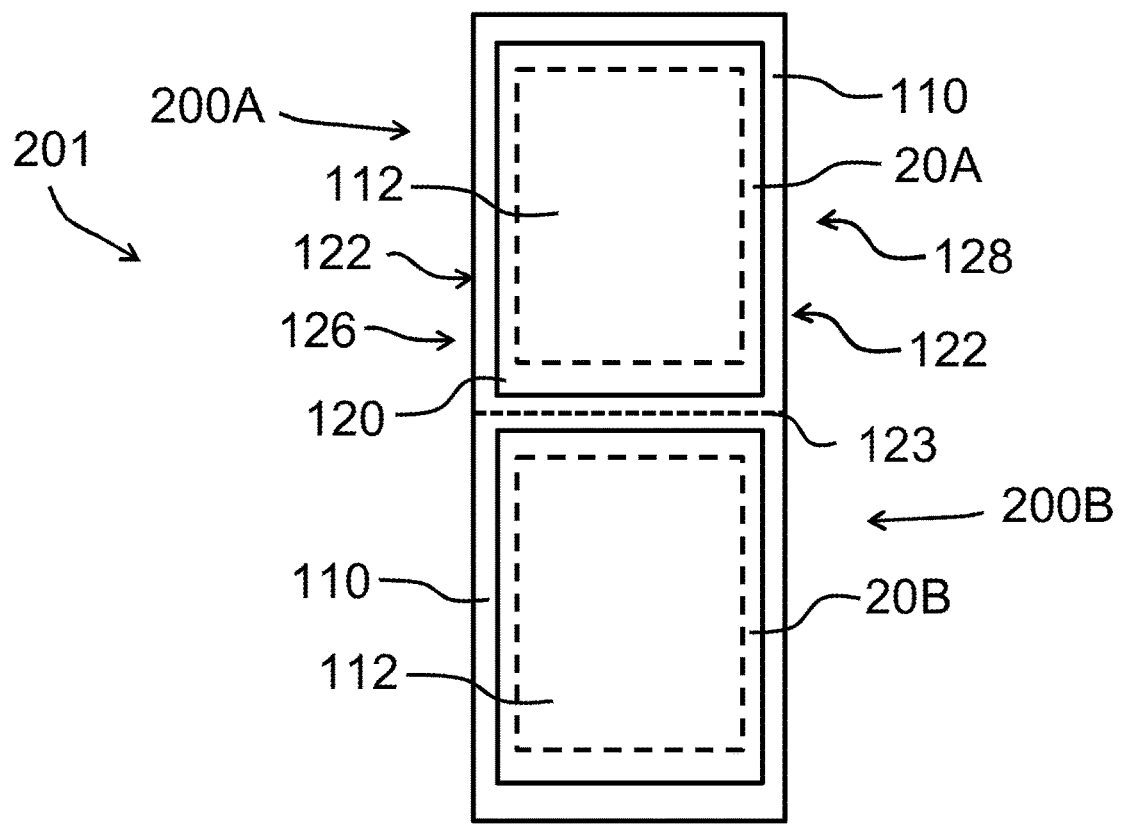
FIG. 7 shows a top view of another exemplary embodiment of labels according to the invention manufactured by means of a method according to the invention.
Figure 8:
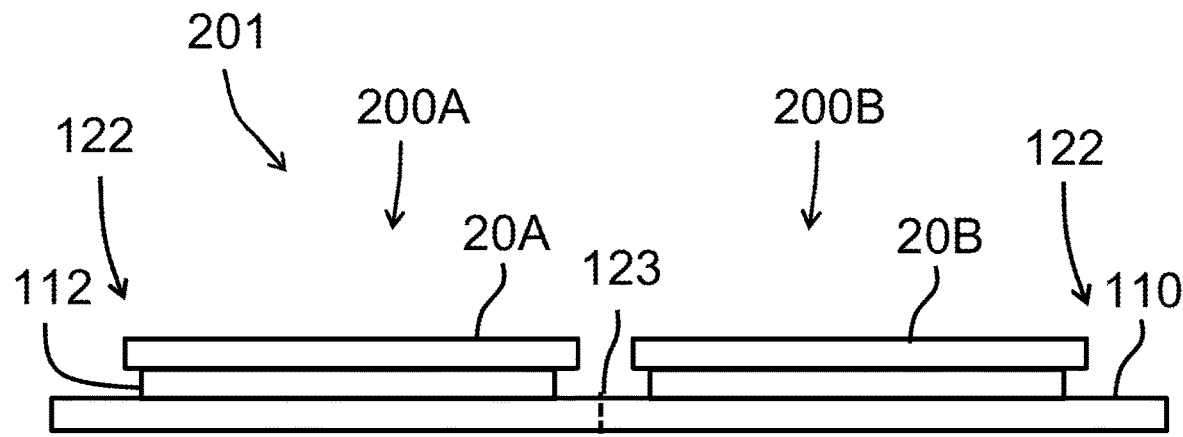
FIG. 8 shows a lateral view of the labels of FIG. 7.

FIGS. 7 and 8 show a further exemplary embodiment of labels 200A, 200B according to the invention, which have been separated from the label tape 160 shown in FIG. 6 by means of at least one separating device in a separating step of the method according to the invention.

The labels 200A, 200B shown in FIGS. 7 and 8 have substantially the same or at least similar features as the label 100 of FIGS. 3 and 4. The same or at least similar features are therefore indicated in FIGS. 7 and 8 with the same reference signs as in FIGS. 3 and 4.

In contrast to the label 100, which has been completely separated from the label tape 60 as an individual label, the labels 200A, 200B are formed as label strips 201 with a plurality of individual labels 200A, 200B that are at least still partially connected to each other. In FIG. 7, two interconnected individual labels 200A, 200B are shown. However, this is merely an exemplary illustration. More than two individual labels 200A, 200B may also be connected to each other in a label strip 201.

To manufacture the label strip 201, similar to the label 100, the label tape 160 may be completely separated along separation line 24b to form individual label strips 201. In contrast to the label 100, which was formed by, among other things, a complete separation along separating lines 24a and 24b, the label tape 160 may merely be perforated along the separation line 24a to form a perforation line 203 between the labels 20A, 200B when it comes to the manufacturing of the labels 200A, 200B.

This may allow for the label strip 201, which is preferably wound in a roll, to be arranged, e.g., in a label dispenser in order to remove individual or multiple labels 200A, 200B from the label dispenser and tear them off along the perforation line 203 for appropriate use.

The invention claimed is:

1. A method for manufacturing labels, the method comprising the following steps:
   a) providing a base material web;
   b) applying at least one adhesive with a layer thickness of 40 to 200 µm to the base material web along at least one row by means of at least one applicator, wherein the adhesive is applied to the base material web intermittently along the row so that the row comprises a plurality of individual adhesive regions each spaced apart from one another by adhesive-free regions, wherein the at least one adhesive is a hot melt adhesive;
   c) providing a cover material;
   d) applying the cover material to at least some regions of the base material web so that a plurality of the applied adhesive regions are completely covered by the cover material; and
   e) at least partially separating the base material web and/or the cover material exclusively along adhesive-free regions at a distance of at least 0.5 mm from the adhesive-free regions by means of at least one separating device.

2. The method according to claim 1, wherein the base material web is transported by at least one transportation means at least in some sections along a transport direction of the base material web, and wherein in step b), the row along which the adhesive is applied intermittently to the base material web extends along the transport direction of the base material web.

3. The method according to claim 1, wherein in step d), a plurality of cover material webs are applied to the base material web so that a plurality of the applied adhesive regions are completely covered by a respective cover material web, wherein the cover material webs are applied to the base material web substantially parallel to one another.

4. The method according to claim 1, wherein in step b), the adhesive is applied intermittently to the base material web along at least two rows which are spaced apart from each other by adhesive-free regions running substantially parallel to each other, wherein each row comprises a plurality of individual adhesive regions which are each spaced apart from each other by adhesive-free regions.

5. The method according to claim 1, wherein step e) comprises the following step(s):
   e1) running parallel to the row, the base material web and/or the cover material are separated at least partially outside the adhesive regions; or
   e2) running parallel to the row, the base material web and/or the cover material are separated completely outside the adhesive regions;
   and/or
   e3) running transversely to the row of adhesive regions, the base material web and/or the cover material are separated at least partially outside the adhesive regions; or
   e4) running transversely to the row of adhesive regions, the base material web and/or the cover material are separated completely outside the adhesive regions.

6. The method according to claim 5, wherein steps e1) and e3) or e2) and e4) are performed simultaneously or successively.

7. The method according to claim 1, wherein:
   the base material web is a release material for pulling off from the respective applied adhesive regions of the manufactured label, and the cover material is a plastic film selected from a film of polyester and/or at least one polyolefin; or
   the base material web is a plastic film selected from a film of polyester and/or at least one polyolefin, and the cover material is a release material for pulling off from the respective applied adhesive regions of the manufactured label.

8. The method according to claim 1, wherein, at least prior to step e), at least one marking element is applied to the base material web and/or to the cover material, wherein the separation of the base material web and/or the cover material is controlled at least partially on the basis of the marking element or the marking elements in step e).

9. The method according to claim 1, wherein:
   in step a), the base material web is unwound from a wound base material web roll and fed to the applicator, and/or
   in step c), the cover material is unwound from a wound cover material roll.

10. The method according to claim 1, wherein, in step b), the adhesive regions are applied to the base material web along the row at a distance of 5 mm to 30 mm.

11. The method according to claim 1, wherein, in step b), the adhesive regions are applied to the base material web intermittently along the row at a time interval of 20 ms to 1000 ms.

* * * * *